US012686024B2

(12) United States Patent
McAfee

(10) Patent No.: US 12,686,024 B2
(45) Date of Patent: Jul. 21, 2026

(54) SPRINKLER WITH AN ADJUSTABLE PRESSURE REGULATOR

(71) Applicant: Rain Bird Corporation, Azusa, CA (US)

(72) Inventor: Michael A. McAfee, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 538 days.

(21) Appl. No.: 18/178,015

(22) Filed: Mar. 3, 2023

(65) Prior Publication Data

US 2024/0293833 A1 Sep. 5, 2024

(51) Int. Cl.
*B05B 12/08* (2006.01)
*B05B 15/622* (2018.01)

(52) U.S. Cl.
CPC .......... *B05B 12/087* (2013.01); *B05B 15/622* (2018.02)

(58) Field of Classification Search
CPC ...... B05B 12/087; B05B 15/622; B05B 15/74
See application file for complete search history.

(56) References Cited

U.S. PATENT DOCUMENTS

| | | | |
|---|---|---|---|
| 894,898 | A | 8/1908 | Owen |
| 1,080,675 | A | 12/1913 | Berg |
| 1,123,746 | A | 1/1915 | Howard |
| 1,203,542 | A | 10/1916 | Hawley |
| 1,726,490 | A | 8/1929 | Irving |
| 1,758,119 | A | 5/1930 | Le Moon |
| 1,931,761 | A | 10/1933 | Hertel |
| 2,075,589 | A | 3/1937 | Munz |
| 2,086,281 | A | 7/1937 | Nelson |
| 2,187,549 | A | 1/1940 | Thompson |
| 2,268,855 | A | 1/1942 | Brooks |
| 2,360,203 | A | 10/1944 | Dorval |
| 2,446,918 | A | 8/1948 | Goddard |
| 2,591,282 | A | 4/1952 | Nelson |
| 2,607,623 | A | 8/1952 | Lippert |
| 2,693,816 | A | 11/1954 | Hoelzer |
| 2,796,293 | A | 6/1957 | Becker |
| 2,810,607 | A | 10/1957 | Hruby, Jr. |
| 3,107,056 | A | 10/1963 | Hunter |

(Continued)

OTHER PUBLICATIONS

Brown, Joseph P., U.S. Appl. No. 09/909,415, Abandoned.

(Continued)

*Primary Examiner* — Qingzhang Zhou
(74) *Attorney, Agent, or Firm* — Fitch, Even, Tabin & Flannery, LLP

(57) ABSTRACT

An irrigation device having an adjustable pressure regulator is provided. The irrigation device includes a housing having an inlet and a riser movable relative to the housing between a retracted position and an extended position. A retainer is secured in the riser. A flow tube extends through the retainer and is configured to move relative to the retainer. The irrigation device includes a valve coupled to the riser with the valve closing the inlet when the riser is in the retracted position. The valve is spaced from the retainer in the riser by an axial gap. The irrigation device includes a seat positioned in the axial gap. The seat is adjustably mounted to the valve such that an axial position of the seat relative to the flow tube is adjustable to adjust a regulation pressure of the irrigation device.

20 Claims, 8 Drawing Sheets

(56) References Cited

U.S. PATENT DOCUMENTS

| | | | | | |
|---|---|---|---|---|---|
| 3,263,930 | A | | 8/1966 | Friedmann | |
| 3,323,725 | A | | 6/1967 | Hruby, Jr. | |
| 3,334,817 | A | | 8/1967 | Miller | |
| 3,383,047 | A | | 5/1968 | Hauser | |
| 3,404,840 | A | | 10/1968 | Trickey | |
| 3,404,841 | A | | 10/1968 | Brittain | |
| 3,454,225 | A | | 7/1969 | Hunter | |
| 3,521,822 | A | | 7/1970 | Friedmann | |
| 3,523,647 | A | | 8/1970 | Radecki | |
| 3,567,125 | A | | 3/1971 | Houghton | |
| 3,645,451 | A | | 2/1972 | Hauser | |
| 3,655,132 | A | | 4/1972 | Rosic | |
| 3,734,456 | A | | 5/1973 | Varrin | |
| 3,774,628 | A | | 11/1973 | Norton | |
| 3,782,638 | A | | 1/1974 | Bumpstead | |
| 3,785,565 | A | | 1/1974 | Perry | |
| 3,870,236 | A | | 3/1975 | Sahagun-Barragan | |
| 3,873,030 | A | | 3/1975 | Barragan | |
| 3,896,999 | A | | 7/1975 | Barragan | |
| 3,921,912 | A | | 11/1975 | Hayes | |
| 3,934,820 | A | | 1/1976 | Phaup | |
| 3,948,285 | A | | 4/1976 | Flynn | |
| 4,077,570 | A | | 3/1978 | Harmony | |
| 4,091,997 | A | | 5/1978 | Ridgway | |
| 4,105,050 | A | | 8/1978 | Hendrickson | |
| 4,105,186 | A | | 8/1978 | Eby | |
| 4,132,364 | A | | 1/1979 | Harmony | |
| 4,189,099 | A | | 2/1980 | Bruninga | |
| 4,295,631 | A | | 10/1981 | Allen | |
| 4,314,582 | A | | 2/1982 | Drori | |
| 4,417,691 | A | | 11/1983 | Lockwood | |
| 4,492,210 | A | | 1/1985 | Hunt | |
| 4,498,626 | A | | 2/1985 | Pitchford | |
| 4,562,962 | A | | 1/1986 | Hartman | |
| 4,592,390 | A | | 6/1986 | Boyd | |
| 4,624,412 | A | | 11/1986 | Hunter | |
| 4,625,914 | A | | 12/1986 | Sexton | |
| 4,634,052 | A | | 1/1987 | Grizzle | |
| 4,648,630 | A | | 3/1987 | Bruch | |
| 4,650,118 | A | | 3/1987 | Saarem | |
| 4,681,259 | A | | 7/1987 | Troup | |
| 4,702,417 | A | | 10/1987 | Hartley | |
| 4,708,291 | A | | 11/1987 | Grundy | |
| 4,718,605 | A | | 1/1988 | Hunter | |
| 4,729,511 | A | | 3/1988 | Citron | |
| 4,736,889 | A | | 4/1988 | Stephenson | |
| 4,773,595 | A | | 9/1988 | Livne | |
| 4,784,325 | A | | 11/1988 | Walker | |
| 4,787,558 | A | | 11/1988 | Sexton | |
| 4,790,481 | A | | 12/1988 | Ray | |
| 4,819,875 | A | | 4/1989 | Beal | |
| 4,842,198 | A | | 6/1989 | Chang | |
| 4,848,661 | A | | 7/1989 | Palmer | |
| 4,867,378 | A | | 9/1989 | Kah | |
| 4,867,379 | A | | 9/1989 | Hunter | |
| 4,867,603 | A | | 9/1989 | Chang | |
| 4,874,017 | A | | 10/1989 | Hendrickson | |
| 4,880,167 | A | | 11/1989 | Langa | |
| 4,892,252 | A | | 1/1990 | Bruninga | |
| 4,898,332 | A | | 2/1990 | Hunter | |
| 4,901,924 | A | | 2/1990 | Kah | |
| 4,913,352 | A | | 4/1990 | Witty | |
| 4,919,337 | A | | 4/1990 | Van Leeuwen | |
| 4,925,098 | A | | 5/1990 | Di Paola | |
| 4,955,542 | A | | 9/1990 | Kah | |
| 4,967,961 | A | | 11/1990 | Hunter | |
| 4,971,256 | A | | 11/1990 | Malcolm | |
| 4,972,993 | A | | 11/1990 | Van Leeuwen | |
| 5,009,368 | A | | 4/1991 | Streck | |
| 5,031,833 | A | | 7/1991 | Alkalay | |
| 5,048,757 | A | | 9/1991 | Van Leeuwen | |
| 5,050,800 | A | | 9/1991 | Lamar | |
| 5,052,621 | A | | 10/1991 | Katzer | |
| 5,086,976 | A | | 2/1992 | Sessions | |
| 5,098,021 | A | | 3/1992 | Kah | |
| 5,115,977 | A | | 5/1992 | Alkalay | |
| 5,148,990 | A | | 9/1992 | Kah | |
| 5,148,991 | A | | 9/1992 | Kah | |
| 5,163,622 | A | | 11/1992 | Cohen | |
| 5,174,500 | A | | 12/1992 | Yianilos | |
| 5,207,386 | A | | 5/1993 | Mehoudar | |
| 5,213,303 | A | | 5/1993 | Walker | |
| 5,257,646 | A | | 11/1993 | Meyer | |
| 5,265,803 | A | | 11/1993 | Thayer | |
| 5,288,023 | A | | 2/1994 | Han | |
| 5,330,103 | A | | 7/1994 | Eckstein | |
| 5,335,857 | A | | 8/1994 | Hagon | |
| 5,372,306 | A | | 12/1994 | Yianilos | |
| 5,383,600 | A | | 1/1995 | Verbera | |
| 5,400,973 | A | | 3/1995 | Cohen | |
| 5,417,370 | A | | 5/1995 | Kah | |
| 5,473,961 | A | | 12/1995 | Jackson | |
| 5,524,824 | A | | 6/1996 | Frimmer | |
| 5,556,036 | A | | 9/1996 | Chase | |
| 5,609,303 | A | | 3/1997 | Cohen | |
| 5,620,143 | A | | 4/1997 | Delmer | |
| 5,641,122 | A | | 6/1997 | Alkalai | |
| 5,647,541 | A | | 7/1997 | Nelson | |
| 5,653,390 | A | | 8/1997 | Kah | |
| 5,673,855 | A | | 10/1997 | Nguyen | |
| 5,676,315 | A | | 10/1997 | Han | |
| 5,685,486 | A | | 11/1997 | Spenser | |
| 5,695,123 | A | | 12/1997 | Le | |
| 5,758,682 | A | | 6/1998 | Cain | |
| 5,758,827 | A | | 6/1998 | Van Le | |
| 5,762,270 | A | | 6/1998 | Kearby | |
| 5,779,148 | A | * | 7/1998 | Saarem | B05B 15/622<br>239/104 |
| 5,785,246 | A | | 7/1998 | King | |
| 5,823,440 | A | | 10/1998 | Clark | |
| 5,829,685 | A | | 11/1998 | Cohen | |
| 5,829,686 | A | | 11/1998 | Cohen | |
| 5,871,156 | A | | 2/1999 | Lawson | |
| 5,875,813 | A | | 3/1999 | Cook | |
| 5,875,815 | A | | 3/1999 | Ungerecht | |
| 5,881,757 | A | | 3/1999 | Kuster | |
| 5,899,386 | A | | 5/1999 | Miyasato | |
| 5,938,122 | A | | 8/1999 | Heren | |
| 5,957,391 | A | | 9/1999 | DeFrank | |
| 5,975,430 | A | | 11/1999 | Larsen | |
| 5,992,760 | A | | 11/1999 | Kearby | |
| 6,000,632 | A | | 12/1999 | Wallace | |
| 6,015,102 | A | | 1/2000 | Daigle | |
| 6,029,907 | A | | 2/2000 | McKenzie | |
| 6,039,268 | A | | 3/2000 | Grundy | |
| 6,042,021 | A | | 3/2000 | Clark | |
| 6,050,502 | A | | 4/2000 | Clark | |
| 6,079,437 | A | | 6/2000 | Beutler | |
| 6,085,995 | A | | 7/2000 | Kah | |
| 6,109,545 | A | | 8/2000 | Kah | |
| 6,155,493 | A | | 12/2000 | Kearby | |
| 6,158,675 | A | | 12/2000 | Ogi | |
| 6,178,982 | B1 | | 1/2001 | Longstreth | |
| 6,178,993 | B1 | | 1/2001 | Oberdorfer | |
| 6,179,221 | B1 | | 1/2001 | Goldberg | |
| 6,199,584 | B1 | | 3/2001 | Brown | |
| 6,209,801 | B1 | | 4/2001 | Kearby | |
| 6,213,408 | B1 | | 4/2001 | Shekalim | |
| 6,227,455 | B1 | | 5/2001 | Scott | |
| 6,237,862 | B1 | | 5/2001 | Kah | |
| 6,241,158 | B1 | | 6/2001 | Clark | |
| 6,244,521 | B1 | | 6/2001 | Sesser | |
| 6,260,575 | B1 | | 7/2001 | Brown | |
| 6,263,911 | B1 | | 7/2001 | Brown | |
| 6,263,912 | B1 | | 7/2001 | Brown | |
| 6,264,117 | B1 | | 7/2001 | Roman | |
| 6,336,597 | B1 | | 1/2002 | Kah | |
| 6,364,217 | B1 | | 4/2002 | Lockwood | |
| 6,367,501 | B2 | | 4/2002 | Svehaug | |
| 6,371,390 | B1 | | 4/2002 | Cohen | |
| 6,382,530 | B1 | | 5/2002 | Perkins | |
| D458,554 | S | | 6/2002 | Jolly | |
| 6,457,696 | B1 | | 10/2002 | Hirota | |
| 6,478,237 | B2 | | 11/2002 | Kearby | |

(56) References Cited

U.S. PATENT DOCUMENTS

| | | | |
|---|---|---|---|
| 6,491,235 | B1 | 12/2002 | Scott |
| 6,494,384 | B1 | 12/2002 | Meyer |
| 6,499,672 | B1 | 12/2002 | Sesser |
| 6,568,607 | B2 | 5/2003 | Boswell |
| 6,568,608 | B2 | 5/2003 | Sirkin |
| 6,581,854 | B2 | 6/2003 | Eckstein |
| 6,601,781 | B2 | 8/2003 | Kah |
| 6,607,147 | B2 | 8/2003 | Schneider |
| 6,651,905 | B2 | 11/2003 | Sesser |
| 6,695,223 | B2 | 2/2004 | Beutler |
| 6,732,946 | B2 | 5/2004 | Veazie |
| 6,732,950 | B2 | 5/2004 | Ingham, Jr. |
| 6,732,952 | B2 | 5/2004 | Kah |
| 6,736,332 | B2 | 5/2004 | Sesser |
| 6,736,337 | B2 | 5/2004 | Vildibill |
| 6,799,732 | B2 | 10/2004 | Sirkin |
| 6,802,458 | B2 | 10/2004 | Gregory |
| 6,814,304 | B2 | 11/2004 | Onofrio |
| 6,814,305 | B2 | 11/2004 | Townsend |
| 6,817,543 | B2 | 11/2004 | Clark |
| 6,817,548 | B2 | 11/2004 | Krauth |
| 6,827,291 | B2 | 12/2004 | Townsend |
| 6,834,816 | B2 | 12/2004 | Kah, Jr. |
| 6,840,460 | B2 | 1/2005 | Clark |
| 6,848,632 | B2 | 2/2005 | Clark |
| 6,854,664 | B2 | 2/2005 | Smith |
| 6,869,026 | B2 | 3/2005 | McKenzie |
| 6,883,727 | B2 | 4/2005 | De Los Santos |
| 6,886,761 | B2 | 5/2005 | Cohen |
| 6,893,002 | B2 | 5/2005 | Brice |
| 6,921,029 | B2 | 7/2005 | Lockwood |
| 6,942,164 | B2 | 9/2005 | Walker |
| 6,945,471 | B2 | 9/2005 | McKenzie |
| 6,997,393 | B1 | 2/2006 | Angold |
| 7,017,831 | B2 | 3/2006 | Santiago |
| 7,028,920 | B2 | 4/2006 | Hekman |
| 7,032,836 | B2 | 4/2006 | Sesser |
| 7,040,553 | B2 | 5/2006 | Clark |
| 7,044,403 | B2 | 5/2006 | Kah |
| 7,051,951 | B2 | 5/2006 | Magi |
| 7,143,692 | B2 | 12/2006 | Schmitt |
| 7,143,962 | B2 | 12/2006 | Kah, Jr. |
| 7,152,814 | B1 | 12/2006 | Schapper |
| 7,159,795 | B2 | 1/2007 | Sesser |
| 7,168,444 | B2 | 1/2007 | Sesser |
| 7,168,632 | B2 | 1/2007 | Kates |
| 7,168,634 | B2 | 1/2007 | Onofrio |
| 7,191,958 | B1 | 3/2007 | Wang |
| 7,226,003 | B2 | 6/2007 | Kah |
| 7,232,081 | B2 | 6/2007 | Kah |
| 7,234,651 | B2 | 6/2007 | Mousavi |
| 7,270,280 | B2 | 9/2007 | Belford |
| 7,287,711 | B2 | 10/2007 | Crooks |
| 7,287,712 | B2 | 10/2007 | Kah |
| 7,293,721 | B2 | 11/2007 | Roberts |
| 7,303,153 | B2 | 12/2007 | Han |
| 7,322,533 | B2 | 1/2008 | Grizzle |
| 7,337,988 | B2 | 3/2008 | McCormick |
| 7,370,667 | B2 | 5/2008 | Sesser |
| 7,372,956 | B1 | 5/2008 | Kikinis |
| RE40,440 | E | 7/2008 | Sesser |
| 7,392,956 | B2 | 7/2008 | McKenzie |
| 7,401,622 | B2 | 7/2008 | Ungerecht |
| 7,404,525 | B2 | 7/2008 | Santiago |
| 7,429,005 | B2 | 9/2008 | Schapper |
| 7,438,083 | B2 | 10/2008 | Feith |
| 7,478,526 | B2 | 1/2009 | McAfee |
| 7,478,646 | B2 | 1/2009 | Borrenpohl |
| 7,500,619 | B2 | 3/2009 | Lockwood |
| 7,597,273 | B2 | 10/2009 | McAfee |
| 7,611,077 | B2 | 11/2009 | Sesser |
| 7,621,464 | B2 | 11/2009 | Smith |
| 7,621,467 | B1 | 11/2009 | Garcia |
| 7,628,910 | B2 | 12/2009 | Lockwood |
| 7,631,813 | B1 | 12/2009 | Lichte |
| 7,644,870 | B2 | 1/2010 | Alexander |
| 7,677,469 | B1 | 3/2010 | Clark |
| 7,681,807 | B2 | 3/2010 | Gregory |
| 7,686,235 | B2 | 3/2010 | Roberts |
| 7,686,236 | B2 | 3/2010 | Alexander |
| 7,703,706 | B2 | 4/2010 | Walker |
| 7,793,868 | B2 | 9/2010 | Kah |
| 7,806,382 | B1 | 10/2010 | Palumbo |
| 7,828,229 | B2 | 11/2010 | Kah |
| 7,828,230 | B1 | 11/2010 | Anuskiewicz |
| 7,834,816 | B2 | 11/2010 | Marino |
| 7,841,547 | B2 | 11/2010 | Kah |
| 7,850,094 | B2 | 12/2010 | Richmond |
| 7,854,399 | B2 | 12/2010 | Sirkin |
| 7,861,948 | B1 | 1/2011 | Crooks |
| 7,896,021 | B2 | 3/2011 | Claude |
| 7,971,804 | B2 | 7/2011 | Roberts |
| 8,006,919 | B2 | 8/2011 | Renquist |
| 8,047,456 | B2 | 11/2011 | Kah |
| 8,056,829 | B2 | 11/2011 | Gregory |
| 8,136,743 | B2 | 3/2012 | Kah |
| 8,187,471 | B2 | 5/2012 | Lockwood |
| 8,272,578 | B1 | 9/2012 | Clark |
| 8,297,533 | B2 | 10/2012 | Dunn |
| 8,313,043 | B1 | 11/2012 | Crooks |
| 8,408,228 | B1 | 4/2013 | Jimenez |
| 8,408,482 | B2 | 4/2013 | Gregory |
| 8,444,063 | B2 | 5/2013 | Lichte |
| 8,474,733 | B1 | 7/2013 | Clark |
| 8,540,171 | B2 | 9/2013 | Renquist |
| 8,596,559 | B2 | 12/2013 | Kah, Jr. |
| 8,628,027 | B2 | 1/2014 | Kah |
| 8,636,229 | B1 | 1/2014 | Clark |
| 8,636,230 | B1 | 1/2014 | Clark |
| 8,636,233 | B2 | 1/2014 | Clark |
| 8,714,186 | B2 | 5/2014 | Ungerecht |
| 8,727,238 | B1 | 5/2014 | Clark |
| 8,740,177 | B2 | 6/2014 | Walker |
| 8,746,591 | B2 | 6/2014 | Lichte |
| 8,794,542 | B1 | 8/2014 | Hunter |
| 8,833,672 | B2 | 9/2014 | Skripkar |
| 8,857,742 | B2 | 10/2014 | Onofrio |
| 8,893,986 | B2 | 11/2014 | Kah, Jr. |
| 8,939,384 | B1 | 1/2015 | Anuskiewicz |
| 8,950,789 | B2 | 2/2015 | Jahan |
| 8,955,767 | B1 | 2/2015 | Clark |
| 8,991,725 | B2 | 3/2015 | Kah |
| 8,991,726 | B2 | 3/2015 | Kah, Jr. |
| 8,991,730 | B2 | 3/2015 | Kah, Jr. |
| 8,998,107 | B2 | 4/2015 | Sesser |
| 9,038,665 | B2 | 5/2015 | Cheng |
| 9,038,924 | B2 | 5/2015 | Lo |
| 9,120,111 | B2 | 9/2015 | Nations |
| 9,138,767 | B2 | 9/2015 | Franks |
| 9,138,768 | B2 | 9/2015 | Jahan |
| 9,156,043 | B2 | 10/2015 | Walker |
| 9,169,944 | B1 | 10/2015 | Dunn |
| 9,192,956 | B2 | 11/2015 | Kah, Jr. |
| 9,205,435 | B1 | 12/2015 | Clark |
| 9,242,255 | B2 | 1/2016 | Lichte |
| 9,296,004 | B1 | 3/2016 | Clark |
| 9,341,270 | B2 | 5/2016 | Boretti |
| 9,348,344 | B2 | 5/2016 | Le |
| 9,387,494 | B2 | 7/2016 | Sesser |
| 9,440,250 | B2 | 9/2016 | Walker |
| 9,446,421 | B1 | 9/2016 | Anuskiewicz |
| 9,459,631 | B2 | 10/2016 | Lawyer |
| 9,511,387 | B2 | 12/2016 | Keren |
| 9,573,145 | B2 | 2/2017 | Kah, Jr. |
| 9,578,817 | B2 | 2/2017 | Dunn |
| 9,616,437 | B2 | 4/2017 | Onofrio |
| 9,662,668 | B1 | 5/2017 | Clark |
| 9,776,195 | B2 | 10/2017 | Russell |
| 9,851,037 | B2 | 12/2017 | Whitaker |
| 9,937,513 | B2 | 4/2018 | Kah, III |
| 9,981,276 | B2 | 5/2018 | Kah, Jr. |
| 9,987,639 | B2 | 6/2018 | Russell |
| 10,029,265 | B2 | 7/2018 | Bell |
| 10,058,042 | B2 | 8/2018 | Crist |

(56) References Cited

U.S. PATENT DOCUMENTS

| | | | |
|---|---|---|---|
| 10,099,231 | B2 | 10/2018 | Clark |
| 10,213,802 | B2 | 2/2019 | Kah, Jr. |
| 10,220,405 | B2 | 3/2019 | Kah, Jr. |
| 10,232,387 | B2 | 3/2019 | Kah, Jr. |
| 10,267,248 | B2 | 4/2019 | Kimoto |
| 10,293,359 | B1 | 5/2019 | Polen |
| 10,464,083 | B2 | 11/2019 | Onofrio |
| 10,556,248 | B2 | 2/2020 | Wright, III |
| 10,559,949 | B2 | 2/2020 | Paul |
| 10,717,093 | B2 | 7/2020 | Bell |
| 10,744,522 | B2 | 8/2020 | Wu |
| 10,786,823 | B2 | 9/2020 | Clark |
| 10,828,651 | B2 | 11/2020 | Kah, Jr. |
| 10,850,295 | B2 | 12/2020 | Wildt |
| RE48,397 | E | 1/2021 | Kah, Jr. |
| 10,967,391 | B2 | 4/2021 | Kah, Jr. |
| 11,040,359 | B2 | 6/2021 | Simmons |
| 11,090,675 | B2 | 8/2021 | Renquist |
| 11,103,890 | B1 * | 8/2021 | Morris .................. B05B 12/087 |
| 11,110,477 | B2 | 9/2021 | Luo |
| 11,126,208 | B2 | 9/2021 | Nelson |
| 11,406,999 | B2 | 8/2022 | Belongia |
| 11,408,515 | B2 | 8/2022 | Greenwood |
| 11,478,804 | B2 | 10/2022 | Kah, Jr. |
| 11,511,289 | B2 | 11/2022 | Geerligs |
| 11,612,904 | B2 | 3/2023 | Wildt |
| 11,660,621 | B2 | 5/2023 | Walker |
| 11,701,677 | B2 | 7/2023 | Chou |
| 11,703,889 | B2 | 7/2023 | Belford |
| 11,717,838 | B2 | 8/2023 | Drechsel |
| 11,890,632 | B1 | 2/2024 | Morris |
| 11,933,408 | B2 | 3/2024 | Nelson |
| 2002/0023972 | A1 | 2/2002 | Kah |
| 2002/0104902 | A1 | 8/2002 | Eckstein |
| 2002/0104903 | A1 | 8/2002 | Eckstein |
| 2002/0130202 | A1 | 9/2002 | Kah |
| 2002/0158145 | A1 | 10/2002 | Schneider |
| 2003/0006306 | A1 | 1/2003 | Clark |
| 2003/0006307 | A1 | 1/2003 | Clark |
| 2003/0155433 | A1 | 8/2003 | Gregory |
| 2003/0213856 | A1 | 11/2003 | Sirkin |
| 2003/0218078 | A1 | 11/2003 | Veazie |
| 2004/0050958 | A1 | 3/2004 | McKenzie |
| 2005/0011554 | A1 | 1/2005 | Davila |
| 2005/0133619 | A1 | 6/2005 | Clark |
| 2005/0194464 | A1 | 9/2005 | Bruninga |
| 2006/0049275 | A1 | 3/2006 | Santiago |
| 2006/0086833 | A1 | 4/2006 | Roberts |
| 2006/0186228 | A1 | 8/2006 | Belford |
| 2006/0273196 | A1 | 12/2006 | Crooks |
| 2007/0119974 | A1 | 5/2007 | Johnson |
| 2007/0119975 | A1 | 5/2007 | Hunnicutt |
| 2007/0119978 | A1 | 5/2007 | Wang |
| 2007/0138323 | A1 | 6/2007 | Lee |
| 2007/0194150 | A1 | 8/2007 | Ericksen |
| 2007/0235565 | A1 | 10/2007 | Kah |
| 2007/0262168 | A1 | 11/2007 | Ericksen |
| 2008/0054092 | A1 | 3/2008 | Alexander |
| 2008/0067266 | A1 | 3/2008 | Cohen |
| 2008/0087743 | A1 | 4/2008 | Govrin |
| 2008/0105768 | A1 | 5/2008 | Kertscher |
| 2008/0142618 | A1 | 6/2008 | Smith |
| 2008/0237374 | A1 | 10/2008 | Belford |
| 2008/0257982 | A1 | 10/2008 | Kah |
| 2008/0308650 | A1 | 12/2008 | Clark |
| 2009/0065606 | A1 | 3/2009 | Lee |
| 2009/0072048 | A1 | 3/2009 | Renquist |
| 2009/0159726 | A1 | 6/2009 | Thompson |
| 2009/0165879 | A1 | 7/2009 | Socolsky |
| 2009/0173804 | A1 | 7/2009 | Kah |
| 2009/0188988 | A1 | 7/2009 | Walker |
| 2009/0314377 | A1 | 12/2009 | Giuffre |
| 2010/0078508 | A1 | 4/2010 | South |
| 2010/0090024 | A1 | 4/2010 | Hunnicutt |
| 2010/0090036 | A1 | 4/2010 | Allen |
| 2010/0108787 | A1 | 5/2010 | Walker |
| 2010/0243762 | A1 | 9/2010 | Onofrio |
| 2010/0276512 | A1 | 11/2010 | Nies |
| 2010/0301135 | A1 | 12/2010 | Hunnicutt |
| 2010/0301142 | A1 | 12/2010 | Hunnicutt |
| 2010/0327083 | A1 | 12/2010 | Kah |
| 2011/0017842 | A1 | 1/2011 | Nations |
| 2011/0036933 | A1 | 2/2011 | Kah |
| 2011/0057048 | A1 | 3/2011 | McAfee |
| 2011/0068195 | A1 | 3/2011 | Franks |
| 2011/0084151 | A1 | 4/2011 | Dunn |
| 2012/0285557 | A1 | 11/2012 | Ungerecht |
| 2014/0042250 | A1 | 2/2014 | Maksymec |
| 2014/0042251 | A1 | 2/2014 | Maksymec |
| 2014/0246513 | A1 | 9/2014 | Terrell |
| 2014/0263735 | A1 | 9/2014 | Nations |
| 2015/0083828 | A1 | 3/2015 | Maksymec |
| 2015/0351332 | A1 | 12/2015 | Janku |
| 2016/0243563 | A1 | 8/2016 | Maksymec |
| 2018/0015487 | A1 | 1/2018 | Russell |
| 2018/0250692 | A1 | 9/2018 | Kah, Jr. |
| 2019/0076858 | A1 | 3/2019 | Clark |
| 2019/0143360 | A1 | 5/2019 | Kah, Jr. |
| 2019/0143361 | A1 | 5/2019 | Kah, Jr. |
| 2020/0026313 | A1 | 1/2020 | Weingarten |
| 2020/0156099 | A1 | 5/2020 | Wright, III |
| 2021/0095778 | A1 | 4/2021 | Hansen |
| 2021/0162449 | A1 | 6/2021 | Mcafee |
| 2021/0404572 | A1 | 12/2021 | Nelson |
| 2022/0022391 | A1 | 1/2022 | Gazit |
| 2022/0152642 | A1 | 5/2022 | Mcafee |
| 2022/0297139 | A1 | 9/2022 | Bell |
| 2022/0297140 | A1 | 9/2022 | Mcafee |
| 2022/0339656 | A1 | 10/2022 | Belongia |
| 2023/0088593 | A1 | 3/2023 | Batista Estévez |
| 2023/0089249 | A1 | 3/2023 | Bell |
| 2025/0076904 | A1 | 3/2025 | Burcham |

OTHER PUBLICATIONS

Roberts, James C., U.S. Appl. No. 12/361,227, filed Jan. 28, 2009, entitled Channeled Shaft Check Valve Assemblies, Abandoned, 61 pages.

U.S. Appl. No. 62/907,289, filed Sep. 27, 2019 for Irrigation Sprinkler Service Valve, 27 pages.

Utility U.S. Appl. No. 17/975,345, filed Oct. 27, 2022 for Multi-Mode Rotor Sprinkler Apparatus and Method, 50 pages.

U.S. Appl. No. 16/948,605; Final Rejection mailed Jun. 20, 2023; (pp. 1-8).

U.S. Appl. No. 16/948,605; Non-Final Rejection mailed Dec. 23, 2022; (pp. 1-7).

U.S. Appl. No. 16/948,605; Notice of Allowance and Fees Due (PTOL-85) mailed Sep. 20, 2023; (pp. 1-7).

U.S. Appl. No. 17/526,214; Final Rejection mailed Aug. 11, 2023; (pp. 1-15).

U.S. Appl. No. 17/526,214; Non-Final Rejection mailed Apr. 6, 2023; (pp. 1-11).

U.S. Appl. No. 16/948,605; Notice of Allowance and Fees Due (PTOL-85) mailed Jan. 5, 2024; (pp. 1-7).

U.S. Appl. No. 18/194,154; Non-Final Rejection mailed Aug. 13, 2025; (pp. 1-9).

* cited by examiner

SPRINKLER WITH AN ADJUSTABLE PRESSURE REGULATOR

FIELD

This disclosure relates to irrigation devices and, more particularly, to pressure regulators for irrigation devices.

BACKGROUND

Many sprinklers have pressure regulators that limit the pressure of the water emitted from the sprinkler. Many of these pressure regulators are fixed to regulate to predetermined pressure. If a different regulated pressure is desired, the sprinkler is replaced with a sprinkler having a pressure regulator fixed at the different desired pressure value. For instance, some irrigation suppliers offer two different regulation pressures. For example, spray nozzles operate best at 30 psi, while rotary nozzles operate optimally at 45 psi.

DETAILED DESCRIPTION

Figure 1:
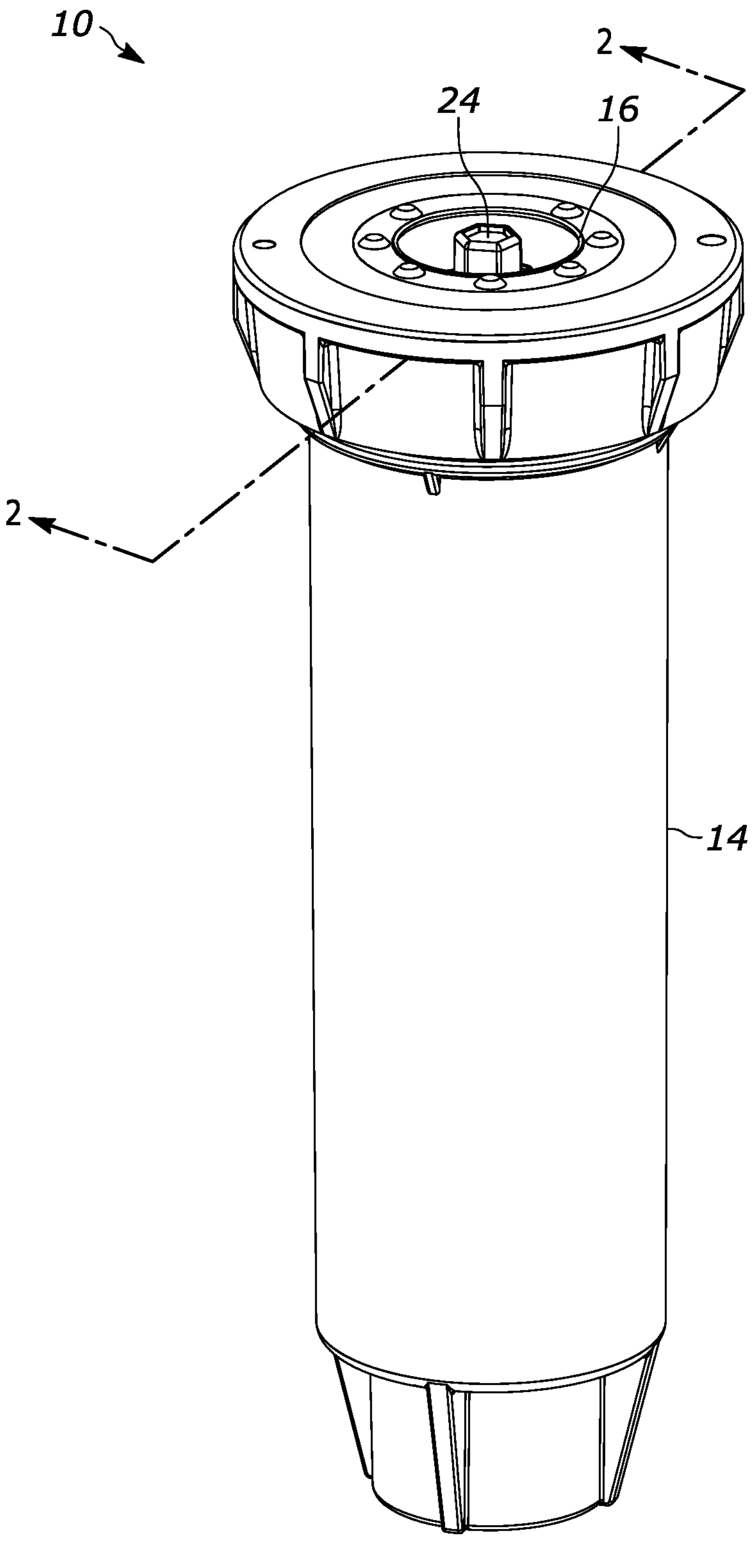
FIG. 1 is a perspective view of a sprinkler having an adjustable pressure regulator system shown with a riser in a retracted position.

With respect to FIGS. 1-4, a sprinkler 10 with an adjustable pressure regulator 12 is provided. The pressure regulator 12 limits the pressure of the water emitted from the sprinkler 10 so that the emitted water pressure does not exceed a set pressure. The pressure regulator 12 may be manually adjusted to increase and/or decrease the regulation pressure as discussed below. The regulation pressure of the pressure regulator 12 may be adjustable by a user in a certain range of pressures, e.g., 35 psi to 45 psi. In other examples, however, the pressure regulator 12 may be adjustable within a different range of regulation pressures.

In the example illustrated, the sprinkler 10 is a pop-up sprinkler that includes a stationary housing 14 and a riser 16 that reciprocates in (see FIGS. 2 and 4) and out (see FIG. 3) of the housing 14. The sprinkler 10 has a spring 18 that retracts the riser 16 into the housing 14 between irrigation cycles. The housing 14 includes an inlet 20 that is connectable to irrigation conduit connected to a water source. The inlet 20 may have threads 20A such that the inlet 20 may be threaded to a connector of an irrigation system. During an irrigation cycle, water flows into the inlet 20 of the sprinkler 10, and the water pressure forces the riser 16 to move upward relative to the housing 14 to the extended position (shown in FIG. 3) against the bias of the spring 18. Water flows along flow path 23 (see FIG. 3) through the inlet 20, around a valve body 22 of the riser 16, through the pressure regulator 12, and out of the sprinkler 10 through an outlet, such as nozzle 24, at an upper end of the riser 16. The spring 18 forces the riser 16 to return to its retracted position when the bias force of the spring 18 overcomes the force of the water on the riser 16. The spring 18 forces the valve body 22 to seat in the inlet 20 to close the inlet 20 between irrigation cycles as discussed below.

Figure 5:
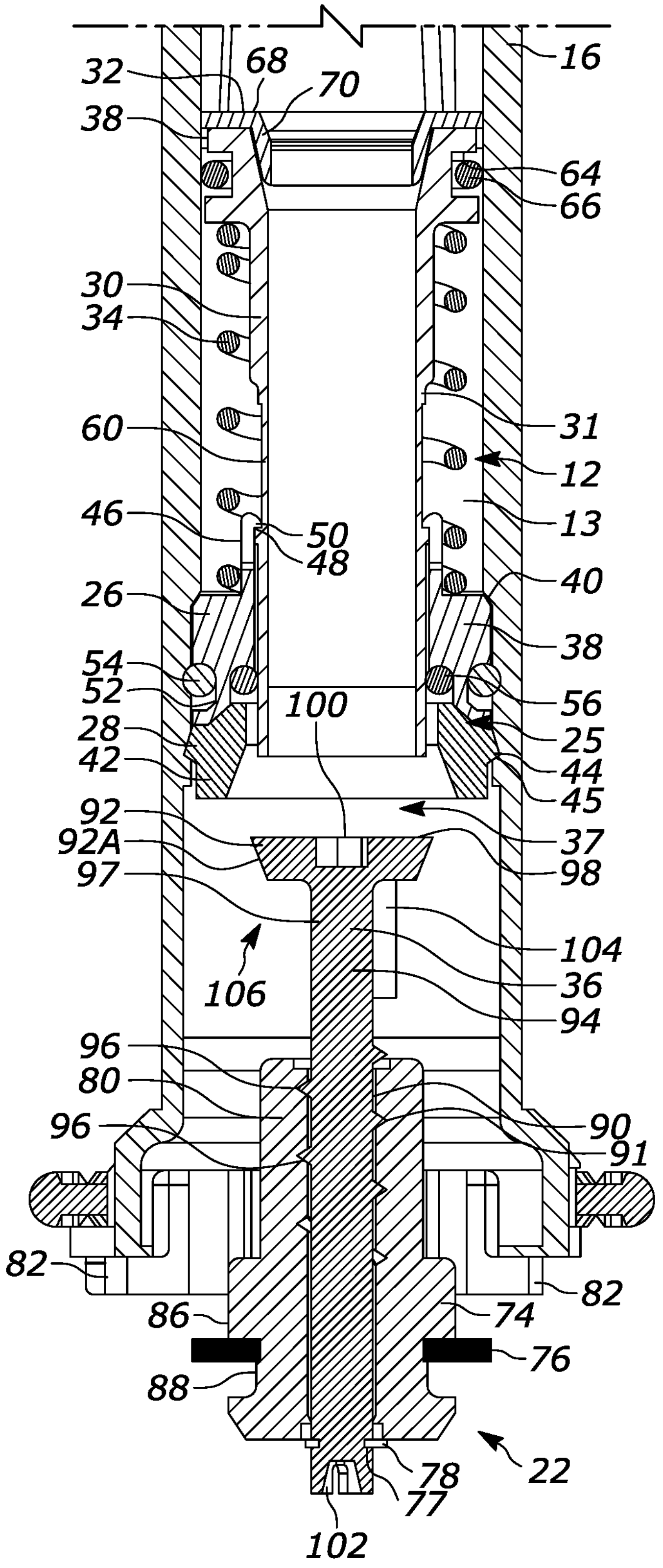
FIG. 5 is a close-up view of a portion of the riser of the sprinkler of FIG. 1 including the adjustable pressure regulator and an inlet valve body.
Figure 6:
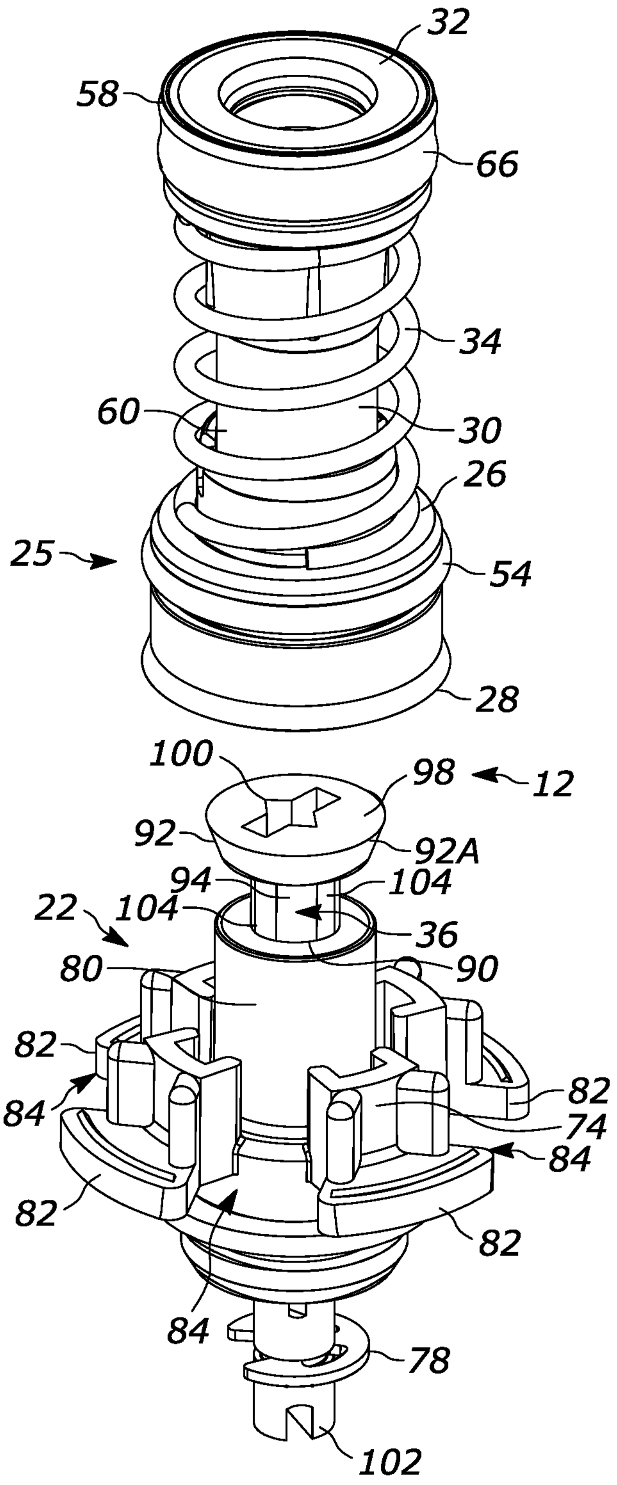
FIG. 6 is a perspective view of the adjustable regulator seat of the adjustable pressure regulator system and the inlet valve body of the sprinkler of FIG. 1.
Figure 7:
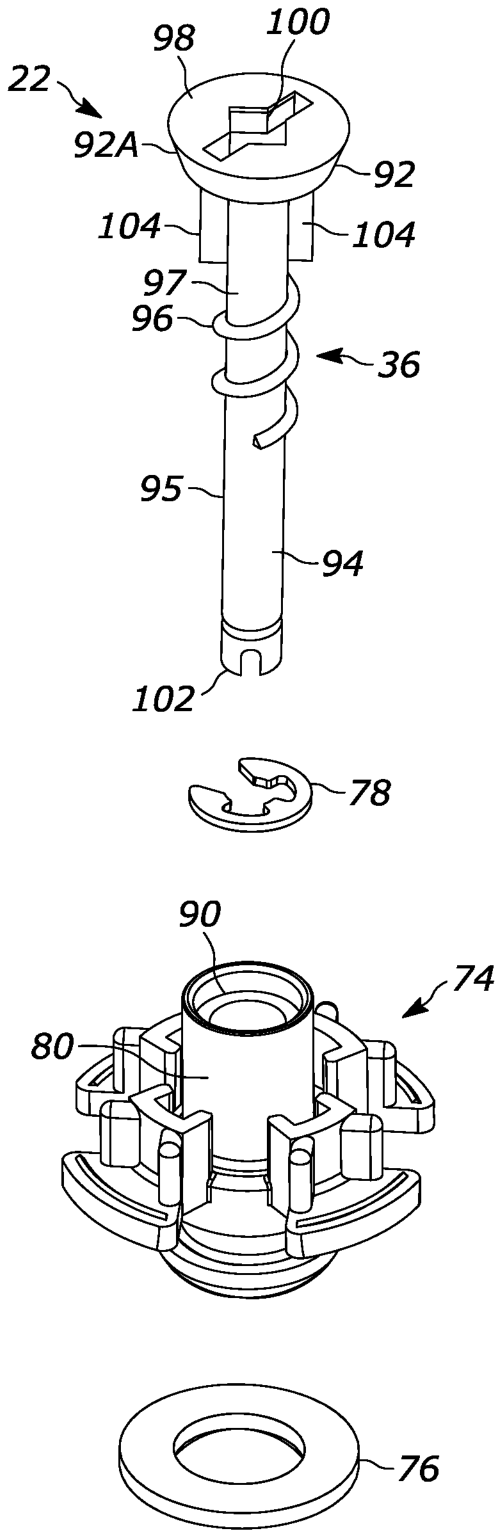
FIG. 7 is a top perspective exploded view of adjustable regulator seat of the adjustable pressure regulator system and the inlet valve body of the sprinkler of FIG. 1.
Figure 8:
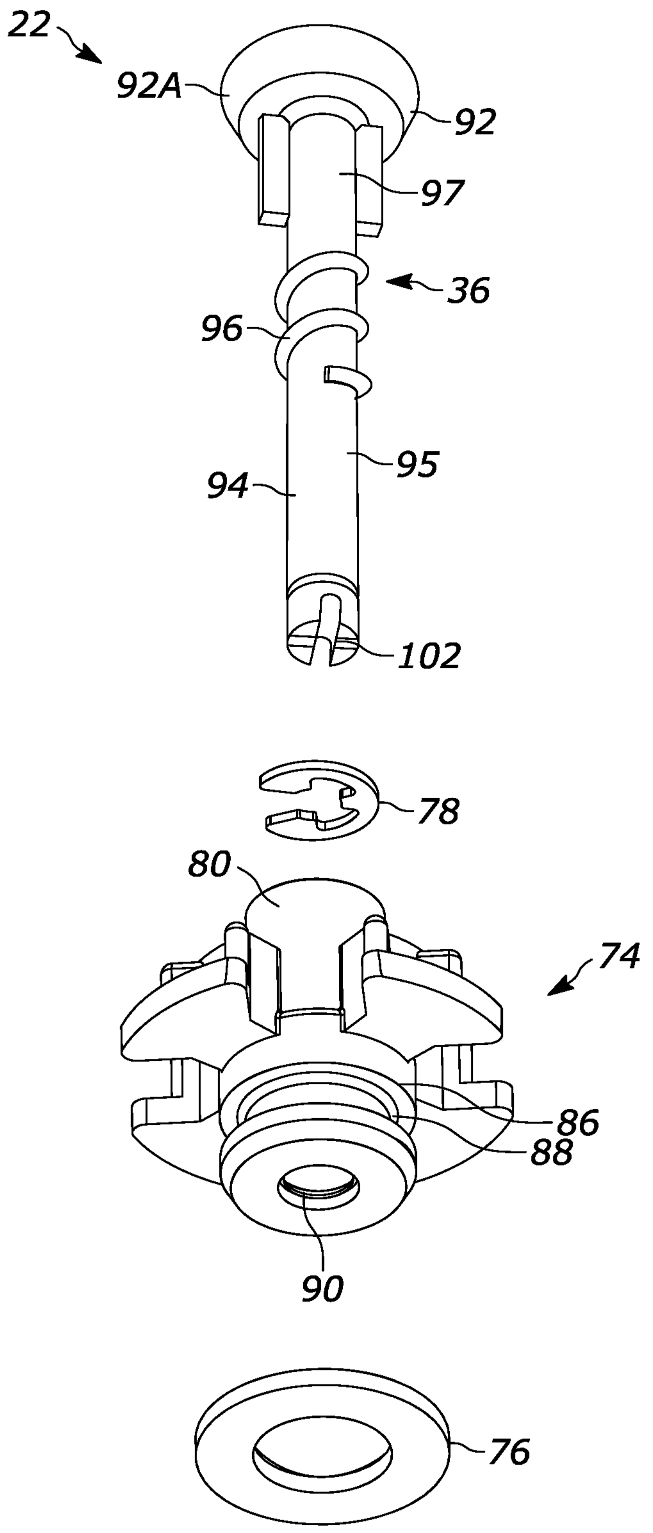
FIG. 8 is a bottom perspective exploded view of the adjustable regulator seat of the adjustable pressure regulator system and the inlet valve body of the sprinkler of FIG. 1.

With respect to FIGS. 5-6, the pressure regulator 12 includes a retainer 25, a flow tube 30, a shroud 32, a spring 34, and a seat 36. The retainer 25 is secured to the riser 16. In the example illustrated, the retainer 25 is comprised of a first retainer portion 26 and a second retainer portion 28. In some forms, the first and second retainer portions 26, 28 are formed as a single piece. The flow tube 30 moves toward and/or away from the seat 36 to regulate the pressure of the water emitted from the sprinkler 10. The shroud 32 serves as a stop to limit the movement of the flow tube 30 away from the seat 36. The spring 34 extends between the first retainer portion 26 and an upper flange 58 of the flow tube 30 to bias the flow tube 30 downstream toward the shroud 32 and away from the seat 36. As water pressure downstream of the flow tube 30 increases, the water pressure applies a force to the flow tube 30, for example, at the flow tube flange 58, which may force the flow tube 30 to move toward the seat 36 against the bias of the spring 34. As the flow tube 30 moves toward the seat 36, an annular gap 37 between a perimeter of the seat 36 and the end of the flow tube 30 decreases. Decreasing the gap 37 between the flow tube 30 and the seat 36 reduces the flow area which results in an increase in the pressure drop of the water as the water enters the flow tube 30. In other words, decreasing the gap 37 restricts the amount of water able to flow into the flow tube 30, which reduces the pressure on the water emitted from the sprinkler 10 downstream of the shroud 32. As the flow tube 30 moves away from the seat 36 (when the bias force of the spring 34 exceeds the force of the water pressure on the flow tube 30), the annular gap 37 between the flow tube 30 and the seat 36 enlarges which increases the pressure on the water emitted from the sprinkler 10. This ensures that the water pressure at the nozzle is proper and optimized for the nozzle so that the right amount of water discharges from the nozzle. Too much pressure causes the water to mist, which effects the travel distance of the water, and results in overwatering.

The first retainer portion 26 includes an annular body 38 received in the riser 16 through which the flow tube 30 extends. The inner surface of the riser 16 includes a step 40 limiting axial movement of the first retainer portion 26 in the downstream direction. The second retainer portion 28 includes an annular body 42 received in the riser 16 through which the flow tube 30 extends. The second retainer portion 28 includes an annular protrusion 44 that may be received in an annular recess 45 of the riser 16 to secure the second retainer portion 28 and first retainer portion 26 in the riser 16 and inhibit the first retainer portion 26 and second retainer portion 28 from axial movement in the upstream direction.

The first retainer portion 26 has retention arms 46 that extend along the flow tube 30 to limit axial movement of the flow tube 30 in the downstream direction (e.g., due to the bias of spring 34). The retention arms 46 may be annular or partially annular extending about the circumference of the flow tube 30. The retention arms 46 have hooks 50 that contact an annular protrusion 48 of the flow tube 30 when the flow tube 30 is moved downstream. The hooks 50 limit how far the flow tube 30 is able to move downstream relative to the first retainer portion 26.

The retainer 25 may also serve as a stop to limit movement of the flow tube 30 in the upstream direction. For example, the hooks 50 may contact a shoulder 31 of the flow tube 30 when the flow tube 30 moves upstream. The shoulder 31 is sized such that it is not able to pass through the opening defined by hooks 50, for example, having a larger diameter that the hooks 50. The hooks 50 may also help guide the flow tube 30 as it travels within the riser 16.

The first retainer portion 26 further includes a gland or an annular recess 52 that receives a seal 54, such as an O-ring. The seal 54 extends from the first retainer portion 26 to the inner surface of the riser 16 to form a fluid tight connection that prevents water flow flowing between the first retainer portion 26 and the riser 16.

The pressure regulator 12 may further include a seal 56, such as an O-ring, positioned between an inside surface of the first retainer portion 26 and the flow tube 30. The seal 56 may form a fluid tight connection between the first retainer portion 26 and the flow tube 30 as the flow tube 30 moves relative to the first retainer portion 26 to prevent water from flowing between the first retainer portion 26 and the flow tube 30. The seal 56 may be positioned between the first retainer portion 26 and the second retainer portion 28 which hold the seal 56 in place.

The flow tube 30 has an upper flange 58 and a tube portion 60 defining a portion of the fluid flow path 23 extending from the upper flange 58. The spring 34 may contact the upper flange 58 to bias the flow tube 30 downstream. The upper flange 58 includes an annular recess 64 receiving a seal 66, such as an O-ring. The seal 66 extends between the flow tube 30 and the interior surface of the riser 16 forming a fluid tight connection therebetween as the flow tube 30 moves relative to the riser 16. The seals 54, 56 of the retainer 25 and the seal 66 of the flow tube 30 form an air chamber 13 between the upper flange 58 of the flow tube 30 and the retainer 25. These seals ensure that the air chamber 13 remains at atmospheric pressure regardless of the water pressure in the riser 16 which permits the flow tube 30 to move toward the seat as the downstream pressure increases.

The shroud 32 has a plate portion 68 and a tube portion 70. The plate portion 68 is fixed in the riser 16 and serves a downstream stop for the flow tube 30. The tube portion 70 may extend into the fluid flow path 62 of the flow tube 30. The shroud 32 aids to prevent debris from passing between the riser 16 and the upper flange 58 of the flow tube 30 to ensure the seal 66 forms a fluid tight seal therebetween.

With respect to FIGS. 5-8, the inlet valve body 22 includes a body 74, a seal 76, the pressure regulator seat 36, and a clip 78. The body 74 is separated and spaced apart from the retainer 25 by an axial gap 106. The body 74 has a central portion 80 and attachment arms 82 extending radially outward from the central portion 80. The attachment arms 82 may be connected to an end portion of the riser 16 to attach the inlet valve body 22 to the riser 16. For example, the attachment arms 82 may be welded to the end portion of the riser 16 (e.g., by sonic welding). The body 74 includes gaps 84 between the attachment arms 82 through which water is able to flow into the riser 16.

Figure 2:
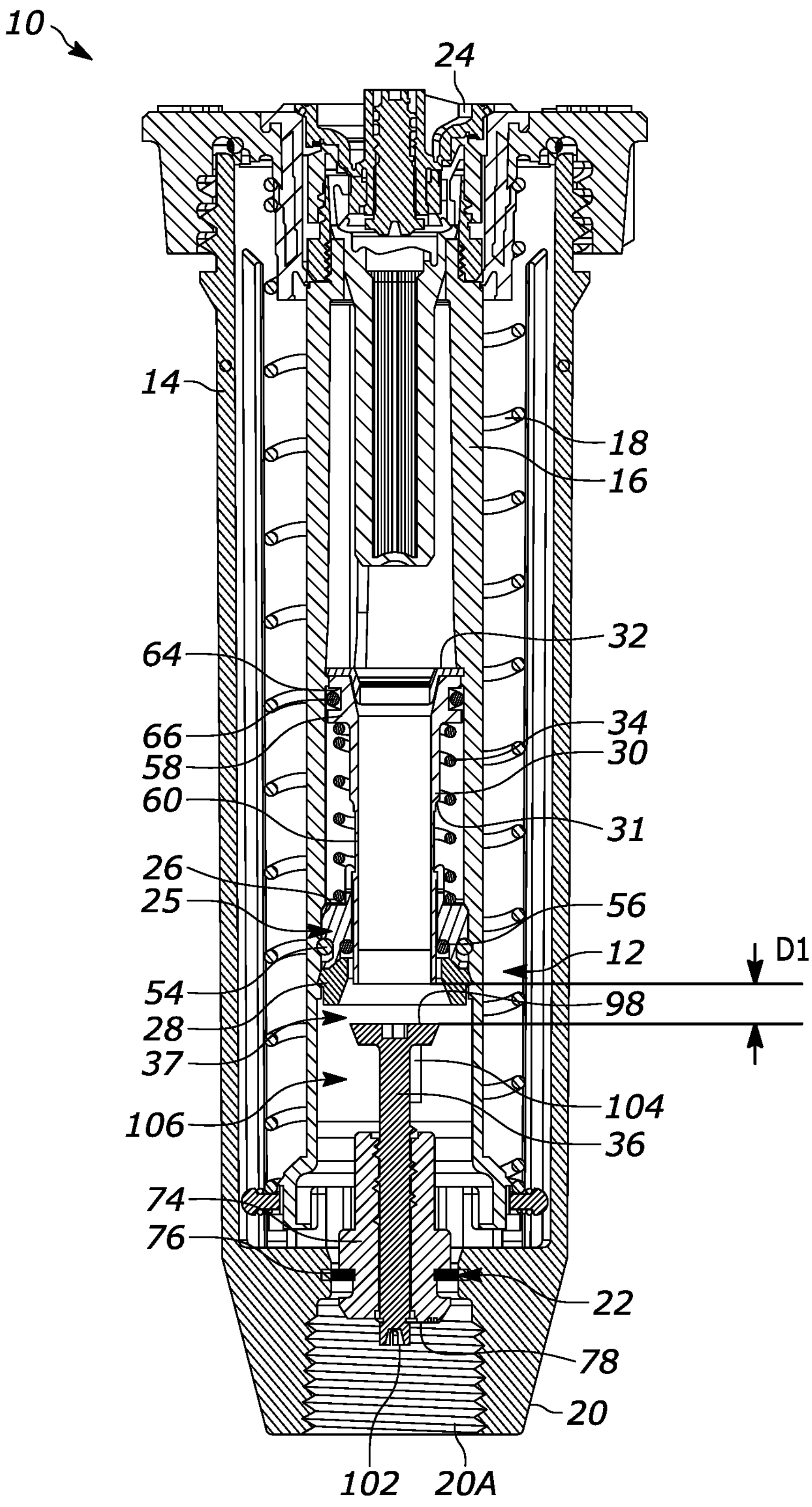
FIG. 2 is a cross-section view of the sprinkler of FIG. 1 taken along line 2-2 of FIG. 1 with the riser in the retracted position and with an adjustable regulator seat of the adjustable pressure regulator system in a first position.
Figure 3:
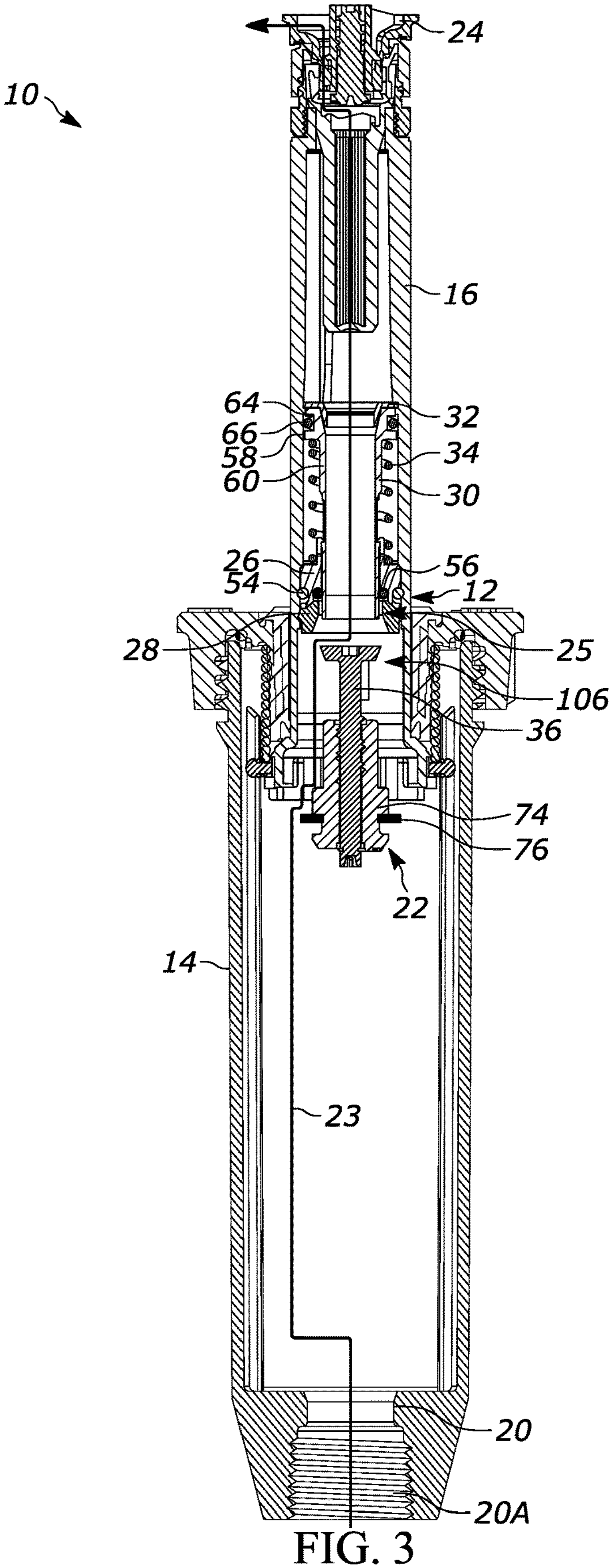
FIG. 3 is a cross-section view of the sprinkler of FIG. 1 taken similar to FIG. 2 with the riser in an extended position.

The lower end 86 of the central portion 80 of the body 74 below the attachment arms 82 includes an annular recess 88 that may receive the seal 76 (e.g., a washer seal) in applications where it is desired to close the inlet 20, for example, between irrigation cycles. The lower end 86 of the central portion 80 may be sized to be removably inserted into the inlet 20 of the sprinkler housing 14 to close and open the inlet 20 of the sprinkler 10 as the riser 16 moves between the extended and retracted configurations. As shown in FIG. 2, when the riser 16 is in the retracted configuration, the lower end 86 of the central portion 80 of the inlet valve body 22 is inserted into the inlet 20 of the housing 14. The seal 76 extends from the body 74 to the wall of the housing 14 defining the inlet 20 to seal the inlet 20. The seal 76 may inhibit water from flowing out of the sprinkler 10 when the water pressure upstream of the sprinkler 10 is low and not high enough to overcome the biasing force of the spring 34 of the riser 16. When the water pressure increases (e.g., during an irrigation cycle), the force of the water pressure on the inlet valve body 22 overcomes the biasing force of the spring 34 moving the riser 16 toward the extended configuration shown in FIG. 3. When in the extended configuration, the lower end 86 of the body 74 and the seal 76 are moved upward and out of the inlet 20 of the housing 14 permitting water to flow through the inlet 20 and out of the sprinkler 10.

The central portion 80 of the body 74 defines a cylindrical socket 90 with internal threads 91 for receiving the seat 36. The seat 36 includes a disc or enlarged head 92 and a shaft 94 extending from the head 92. The shaft 94 includes a smooth segment 95, a threaded segment 96, and a spacing segment 97. The smooth segment 95 is sized to be inserted through the socket 90 of the plug body 74 beyond the threads 91. The threaded segment 96 includes threads that cooperate with the threads 91 of the socket 90 of the plug body 74 to adjustably attach the seat 36 to the body 74. The threads of the threaded segment 96 may be sized to have a slight interference with the threads 91 of the socket 90 to aid in holding the seat 36 at the set position and resist unintentional rotation.

The spacing segment 97 of the shaft 94 supports the head 92 of the seat 36 away from the body 74 in an axial gap 106 between the retainer 25 and the body 74. For example, the head 92 may be spaced apart from the plug body 74 a distance in the range of about 2 mm to about 15 mm. Being positioned in the axial gap 106, there is no structure radially outward of the head 92 of the seat 36 between the head 92 and the inner surface of the riser 16. The axial gap 106 provides a space between the plug body 74 and the retainer 25 where the water flowing into the riser 16 floods and pools before flowing through the flow tube 30. Moreover, with no structure around the head 92 of the seat 36, there is no structure that obstructs or restricts the flow of water as it flows around the head 92 and to the flow tube 30, which minimizes the turbulence in the flow to the flow tube 30. The entire annular outer edge 92A of the head 92 is exposed to water flow and guides the waterflow around the head 92 toward the flow tube 30. The annular outer edge 92A of the head 92 may be frustoconical to aid in guiding the flow of water around and past the head 92.

Figure 4:
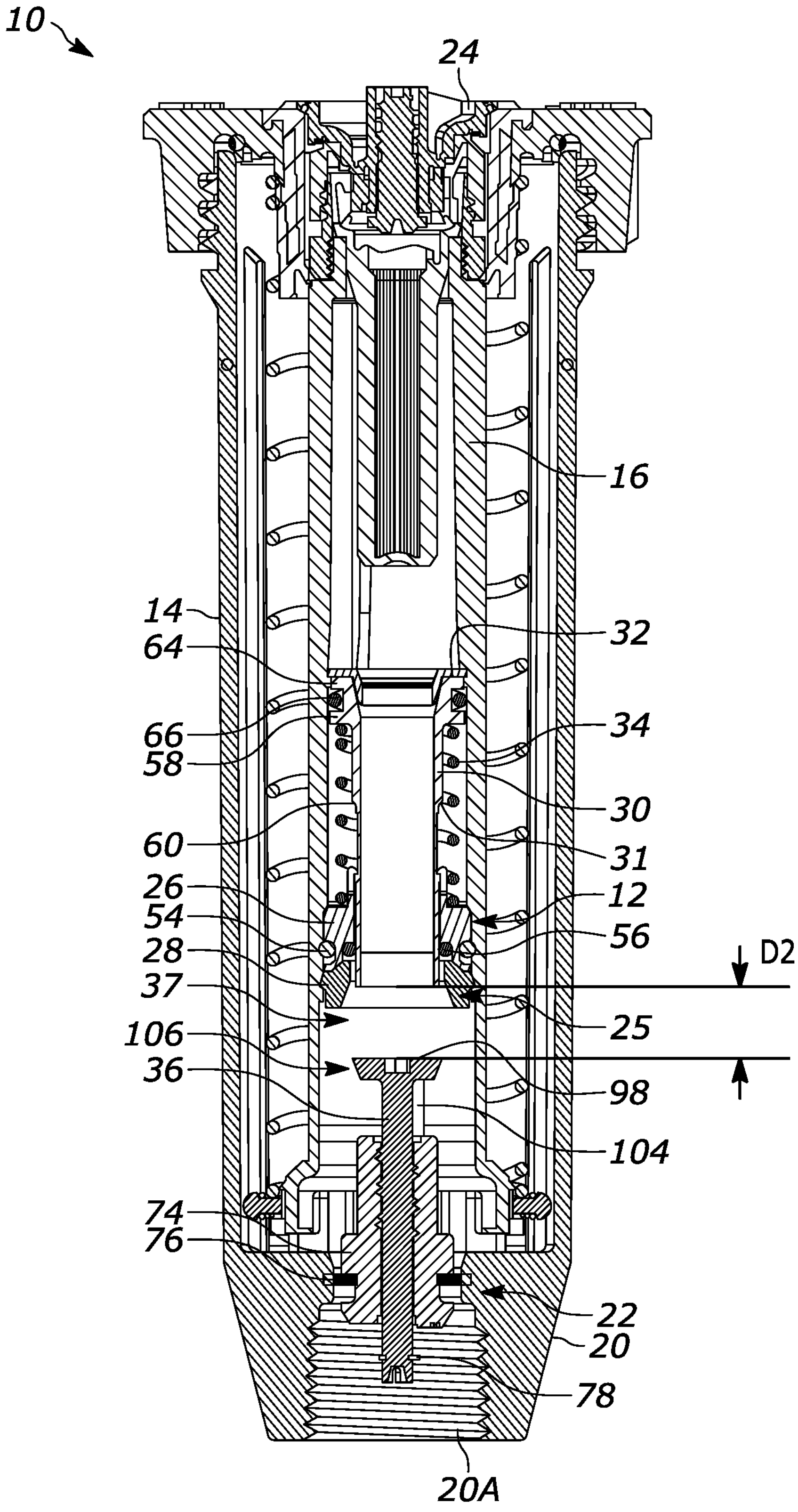
FIG. 4 is a cross-section view of the sprinkler of FIG. 1 taken similar to that of FIG. 2 with the riser in the retracted position and with the adjustable regulator seat of the adjustable pressure regulator system in a second position.

The head 92 includes a floor 98 that the flow tube 30 moves relative to. Movement of the flow tube 30 relative to the floor 98 regulates the pressure of the water emitted from the sprinkler 10 as discussed above. The seat 36 may be rotated relative to the plug body 74 to adjust the position of the floor 98 of the seat 36 relative to the body 74 and the flow tube 30. For example, in FIG. 2, the floor 98 of the seat 36 is a first distance D1 from the end of the flow tube 30. In FIG. 4, the position of the seat 36 is adjusted to increase the distance between the floor 98 and the flow tube 30 to a distance D2. The distance between the floor 98 and the flow tube 30 adjusts the pressure in and downstream of the flow tube 30 and thus the pressure of the water emitted from the sprinkler 10. As the distance between the floor 98 and the flow tube 30 increases, the maximum pressure of the sprinkler 10 at the nozzle is increased because the flow tube 30 must travel farther to reach the floor 98 of the seat 36 to restrict the flow of fluid through the flow tube 30. Because the flow tube 30 must travel farther to reach the floor 98, the force of the water pressure on the flow tube 30 must be greater to compress the spring 34 the increased distance. Thus, when the distance between seat 36 and the flow tube 30 is distance D2, the sprinkler 10 may operate with a greater pressure at the nozzle than when set to D1.

The floor 98 of the seat 36 may include a drive socket 100 into which a drive head of a tool (e.g., a screwdriver) may be inserted to rotate the seat 36 relative to the body 74 to adjust the axial position of the seat 36. The position of the seat 36 may be adjusted without removing the sprinkler 10 from the irrigation system or from the ground. For example, the flush plug or nozzle 24 of the sprinkler 10 may be removed and a shaft of a screwdriver inserted into the sprinkler 10 through the flow tube 30 to the drive socket 100 of the seat 36.

The end of the shaft 94 of the seat 36 opposite the head 92 may also include a drive 102. The drive 102 may be used to adjust the position of the seat 36, and thus the regulation pressure of the sprinkler 10, when the sprinkler 10 is disconnected from the irrigation system. The position of the seat 36 may be set before connecting the sprinkler 10 to the water supply line using the threading in the inlet 20 of the sprinkler 10 and a connector of the irrigation system. For example, a drive head of tool may be inserted through the threaded portion of the inlet 20 to the drive 102 of the seat 36 and turned to move the seat 36 upstream or downstream relative to the flow tube 30.

The position of the seat 36 relative to the body 74 may be adjustable between upper and lower axial limits which set the upper and lower limits of the range of regulation pressure of the pressure regulator 12. The seat 36 may carry stop features that limit the axial movement of the seat 36 relative to the body 74. The seat 36 may include one or more stop protrusions 104 that extend radially outward from the shaft 94 below the head 92. The stop protrusions 104 may be larger than the socket 90 of the body 74 and, thus, inhibit the seat 36 from moving axially away from the flow tube 30 upon the stop protrusions 104 contacting the surface of the body 74 about the socket 90 (see FIG. 4). The stop protrusions 104 may be positioned to ensure that the head 92 of the seat 36 remains spaced from the body 74 and positioned within the axial gap 106 to minimize turbulence in the flow. For example, the stop protrusions 104 may extend axially along the shaft 94 from the head 92 of the seat 36.

The clip 78 may be attached to the shaft 94 of the seat 36 upon being extended through the body 74. The clip 78 may be snapped on to an annular groove 77 (see FIG. 5) formed in the shaft 94. The shaft 94 portion with the groove 77 extends out from the body 74. The clip 78 extends radially outward from the shaft 94 and is not able to pass into the socket 90 of the body 74. The clip 78 thus limits how far the seat 36 is able to be moved axially toward the flow tube 30 upon contacting the surface of the body 74 about the socket 90 (see FIG. 2).

As one example, the maximum pressure of the sprinkler 10 may be adjustable between 30 psi and 45 psi. For example, when the floor 98 of the seat 36 is distance D1 (see FIG. 2) from the flow tube 30, the pressure regulator 12 limits the pressure of the water emitted from the sprinkler 10 to 30 psi. When the seat 36 is rotated to position the floor 98 distance D2 (see FIG. 4) from the flow tube 30, the pressure regulator 12 limits the pressure of the water emitted from the sprinkler 10 to 45 psi. The pressure may be adjusted continuously as the position of the floor 98 travels between the upper and lower limits (distances D1 and D2) to set the regulation pressure of sprinkler 10. In other forms, the range of regulation pressures the adjustable pressure regulator 12 may be set at is larger or smaller. In other forms, the range of pressures is different (e.g., 50 psi to 100 psi). The pitch of the threads 91, 96 of the seat 36 and the socket 90 of the plug body 74 may be smaller to provide more fine control over adjustment of the regulation pressure of the pressure regulator 12. Threads with larger pitch may be used to permit the pressure to be changed more quickly as the seat 36 is turned (e.g., with a screwdriver).

The matter set forth in the foregoing description and accompanying drawings is offered by way of example and illustration only and not as a limitation. While certain embodiments have been shown and described, it will be apparent to those skilled in the art that additions, changes, and modifications may be made without departing from the broader aspects of the technological contribution. The actual scope of the protection sought is intended to be defined in the following claims.

What is claimed is:

1. An irrigation device comprising:
- a housing having an inlet;
- a riser movable relative to the housing between a retracted position and an extended position;
- a retainer secured in the riser;
- a flow tube extending through the retainer and configured to move relative to the retainer;
- a valve coupled to the riser, the valve closing the inlet when the riser is in the retracted position;
- an axial gap in the riser spacing the valve axially away from the retainer; and
- a seat positioned in the axial gap, the seat adjustably mounted to the valve such that an axial position of the seat relative to the flow tube is adjustable, the flow tube movable relative to the seat to control fluid flow into the flow tube,
- wherein adjusting the axial position of the seat adjusts a maximum pressure of the fluid flowing beyond the flow tube.

2. The irrigation device of claim 1 wherein the valve defines a socket with internal threads, and a shaft extending from the seat includes external threads that engage the internal threads of the socket to adjustably mount the seat to the valve.

3. The irrigation device of claim 2 wherein the shaft carries a first stop and a second stop, the first stop limiting axial movement of the seat toward the valve and the second stop limiting axial movement of the seat away from the valve.

4. The irrigation device of claim 2 further comprising a clip attached to the shaft, the clip limiting axial movement of the seat relative to the valve.

5. An irrigation device comprising:
- a housing having an inlet;
- a riser movable relative to the housing between a retracted position and an extended position;
- a retainer secured in the riser;
- a flow tube extending through the retainer and configured to move relative to the retainer;

a valve coupled to the riser, the valve closing the inlet when the riser is in the retracted position;

an axial gap spacing the valve from the retainer; and a seat positioned in the axial gap, the seat adjustably mounted to the valve such that an axial position of the seat relative to the flow tube is adjustable, the flow tube movable relative to the seat to control fluid flow into the flow tube, wherein the valve defines a socket with internal threads, and a shaft extending from the seat includes external threads that engage the internal threads of the socket to adjustably mount the seat to the valve, wherein the shaft includes a spacing portion that supports the seat away from the valve and in the axial gap.

6. The irrigation device of claim 5 wherein the spacing portion of the shaft includes a stop, the stop inhibiting the seat from contacting the valve.

7. The irrigation device of claim 1 further comprising a shaft extending from the seat and through an opening in the valve, an end of the shaft opposite the seat includes a driver used to rotate the shaft to adjust the position of the seat relative to the valve.

8. The irrigation device of claim 1 wherein the seat includes a driver used to rotate the seat to adjust the position of the seat relative to the valve.

9. An irrigation device comprising:

a housing having an inlet;

a riser movable relative to the housing between a retracted position and an extended position;

a retainer secured in the riser;

a flow tube extending through the retainer and configured to move relative to the retainer;

a valve coupled to the riser, the valve closing the inlet when the riser is in the retracted position;

an axial gap in the riser spacing the valve axially away from the retainer; and a seat positioned in the axial gap, the seat adjustably mounted to the valve such that an axial position of the seat relative to the flow tube is adjustable, the flow tube movable relative to the seat to control fluid flow into the flow tube, wherein the valve includes a body to which the seat is mounted, the valve further includes a seal attached to the body to seal the inlet of the housing when the riser is in the retracted position.

10. The irrigation device of claim 1 wherein the seat has an outer annular edge, the annular edge and the riser defining an unobstructed flow path into the flow tube.

11. The irrigation device of claim 10 wherein the outer annular edge of the seat is frustoconical.

12. The irrigation device of claim 1 wherein the valve is in engagement with a shaft extending from the seat to adjustably mount the seat to the valve, wherein the shaft supports the seat away from the valve and in the axial gap.

13. The irrigation device of claim 5 wherein the seat includes a driver used to rotate the seat to adjust the position of the seat relative to the valve.

14. The irrigation device of claim 9 wherein the valve defines a socket with internal threads, and a shaft extending from the seat includes external threads that engage the internal threads of the socket to adjustably mount the seat to the valve.

15. The irrigation device of claim 9 further comprising a shaft extending from the seat and through an opening in the valve, an end of the shaft opposite the seat includes a driver used to rotate the shaft to adjust the position of the seat relative to the valve.

16. The irrigation device of claim 9 wherein the seat includes a driver used to rotate the seat to adjust the position of the seat relative to the valve.

17. The irrigation device of claim 9 wherein the seat has an outer annular edge, the annular edge and the riser defining an unobstructed flow path into the flow tube.

18. The irrigation device of claim 9 wherein valve is in engagement with a shaft extending from the seat to adjustably mount the seat to the valve, wherein the shaft supports the seat away from the valve and in the axial gap.

19. The irrigation device of claim 5 wherein the seat includes a driver used to rotate the seat to adjust the position of the seat relative to the valve.

20. The irrigation device of claim 5 wherein the shaft carries a first stop and a second stop, the first stop limiting axial movement of the seat toward the valve and the second stop limiting axial movement of the seat away from the valve.

* * * * *